US006571104B1

(12) United States Patent
Nanda et al.

(10) Patent No.: US 6,571,104 B1
(45) Date of Patent: May 27, 2003

(54) POWER CONTROL WITH EFFECTIVE $E_B/N_0$

(75) Inventors: Sanjiv Nanda, Clarksburg, NJ (US);
Kiran M. Rege, Marlboro, NJ (US);
Carl Francis Weaver, Hanover Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/390,476

(22) Filed: Sep. 7, 1999

(51) Int. Cl.[7] ............................. H04B 7/00; H04B 7/185

(52) U.S. Cl. ..................... 455/522; 455/69; 370/318; 370/332

(58) Field of Search .................. 455/522, 69, 70, 455/127, 574; 370/318, 317, 332, 333

(56) References Cited

U.S. PATENT DOCUMENTS 5,727,033 A * 3/1998 Weaver et al. ................ 455/69
5,946,346 A   8/1999 Ahmed et al.
6,154,659 A * 11/2000 Jalali et al. .................. 455/522

FOREIGN PATENT DOCUMENTS

WO    WO 00/48336    2/2000

OTHER PUBLICATIONS

S. Nanda et al., "Frame Error Rates For Convolutional Codes On Fading Channels And The Concept Of Effective Eb1No", IEEE Global Telecommunications Conf., Nov. 14, 1995, pp. 27–32.

"Frame Error Rates For Convolutional Codes on Fading Channels and the Concept of Effective Eb/No", by S. Nanda and K. M. Rege, IEEE, 1998, pp., 1245–1250.

"Error Performance of Convolutional Codes in Fading Environments: Heuristices for Effectivve Eb/No Computation", S. Nanda and K. M. Rege, Proceedings of the 1996 Conference on Information Sciences and Systems, vol. I, pp. 119–123.

(List continued on next page.)

Primary Examiner—Charles N. Appiah
(74) Attorney, Agent, or Firm—Irena Lager (57) ABSTRACT

A method and apparatus to quickly adjust a targeted $E_b/N_0$ in a wireless communication system by using an effective $E_b/N_0$ for each frame. The $E_b/N_0$ distribution of a frame produces a certain frame error rate. Effective $E_b/N_0$ is the $E_b/N_0$ that would produce the same frame error rate in a model channel, such as an additive white Gaussian noise (AWGN) channel. The effective $E_b/N_0$ for each frame is obtained and compared to a model targeted $E_b/N_0$. The $E_b/N_0$ for all of the power control groups in one frame compose the vector $E_b/N_0$. The effective $E_b/N_0$ for the frame is obtained by mapping a vector $E_b/N_0$ into a scalar. The model targeted $E_b/N_0$ is the $E_b/N_0$ value that produces a desired frame error rate in the model channel. The targeted $E_b/N_0$ is increased by one up step size when the effective $E_b/N_0$ is smaller than the model targeted $E_b/N_0$ and is decreased by one down step size when the effective $E_b/N_0$ is larger than the model targeted $E_b/N_0$. $E_b/N_0$ are measured for each power control group in a frame. The wireless communication system includes a transmitter to transmit a signal, a receiver to receive the signal, and an outer control loop to adjust the targeted $E_b/N_0$ based on a comparison of the effective $E_b/N_0$ of the signal to the model targeted $E_b/N_0$. Preferably, the outer control loop is implemented in software, although it can be implemented in hardware. Obtaining an effective $E_b/N_0$ for each time period allows quicker adjustments of the targeted $E_b/N_0$. This permits the targeted $E_b/N_0$ to be closer to an $E_b/N_0$ that produces a desired frame error rate, especially if the mobile is moving. This allows the transmitted power to be closer to the power needed to produce the desired frame error rate, permitting an increase in the capacity of the wireless communication system while still maintaining an acceptable number of errors.

30 Claims, 4 Drawing Sheets

OTHER PUBLICATIONS

"Frame Error Rates for Convolutional Codes on Fading Channels and the Concept of Effective Eb/No", by S. Nanda and K. M. Rege, IEEE, 1995, pp. 27–32.

"The Weight Spectra of Some Sjort Low–Rate Convolutional Codes", by Jean Conan, IEEE , vol. 32, No. 9. Sep. 1984, pp. 1050–1053.

* cited by examiner

POWER CONTROL WITH EFFECTIVE $E_B/N_0$

FIELD OF THE INVENTION

The present invention relates to wireless communications systems and, in particular, to power control in wireless communications systems.

BACKGROUND OF THE INVENTION

Wireless communications systems use power control to improve system performance and increase system capacity. Power control involves tracking the fading of communication channels. In order to compensate for the fading, power control uses the tracked fading to manage the power level at which signals are transmitted from base stations to mobile terminals and from mobile terminals to base stations. One type of wireless communication system uses Code Division Multiple Access (CDMA) techniques.

In CDMA communication systems, digital information is encoded in an expanded bandwidth format, and multiple signals are transmitted simultaneously within the same frequency band. The number of signals that can be transmitted simultaneously is limited by the interference they cause each other. Typically, the larger the signal's transmit power the more interference it causes other signals. Thus, reducing the power of the signals increases the capacity of the wireless communication system. However, reducing the power of a signal increases the number of errors in that signal when it is received and decoded by the receiver. A goal of power control is to keep the power level as close as possible to a level that allows the maximum capacity while keeping the number of errors in the signal at an acceptable level.

Figure 1:
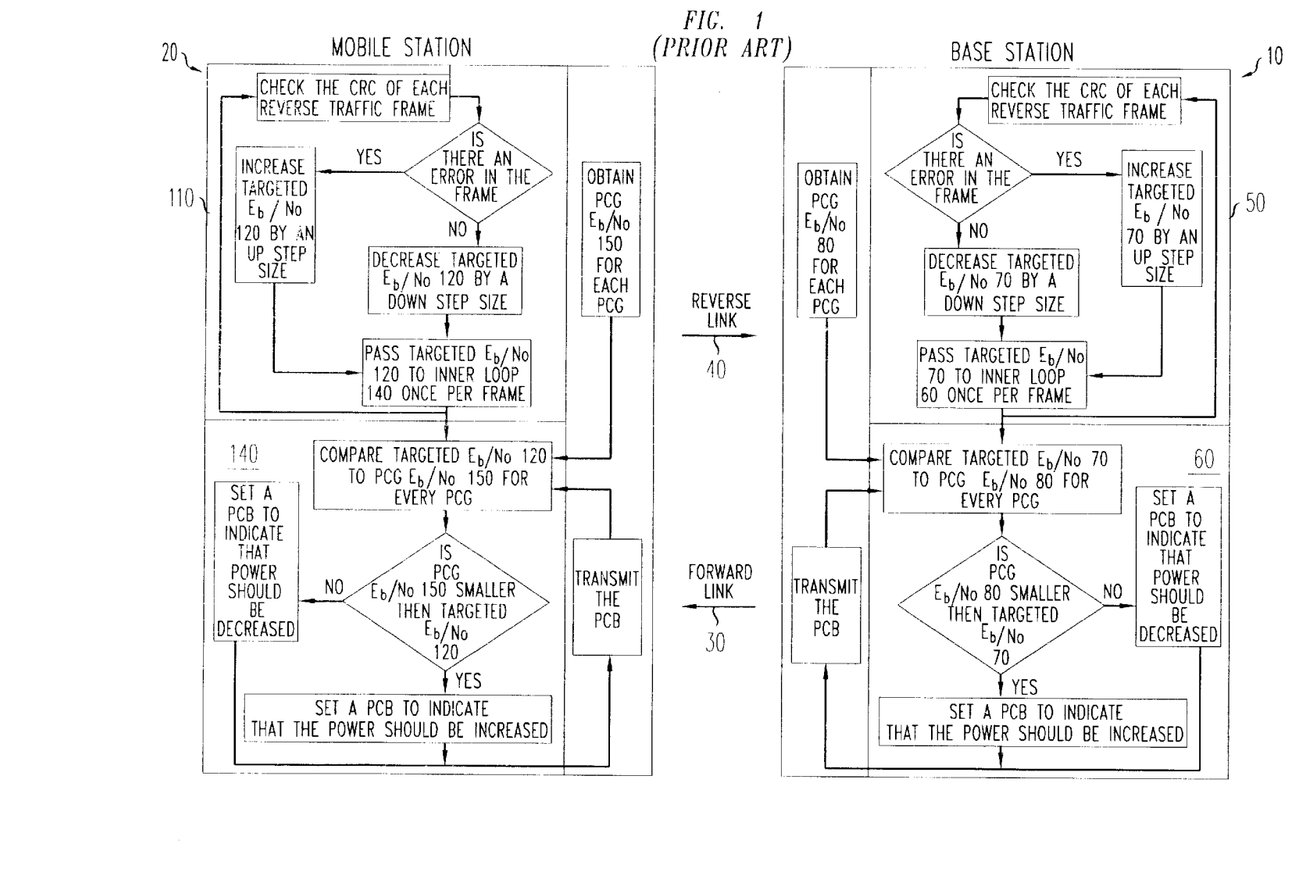
FIG. 1 illustrates power control in a conventional CDMA 2000 system.

As shown in FIG. 1, when a call is set up in a CDMA wireless communications system, base station 10 and mobile terminal 20 communicate over forward link 30 and reverse link 40. Forward link 30 includes communication channels for transmitting signals from the base station to the mobile terminal, and reverse link 40 includes communication channels for transmitting signals from the mobile terminal to the base station. Base station 10 transmits certain types of control information to mobile terminal 20 over a communication channel, referred to herein as a forward control channel, also known in the art as a forward overhead channel. Forward control channels include the pilot, paging, and synchronization channels. Base station 10 transmits voice or data, and certain types of control information over a communication channel, referred to herein as a forward traffic channel. Mobile terminal 20 transmits certain types of control information to base station 10 over a communication channel, referred to herein as a reverse control channel, and it transmits voice or data over a communication channel, referred to herein as a reverse traffic channel. The signals on the communication channels are organized in time periods, referred to herein as frames. Frames are typically 20-millisecond (ms) in length. The signals transmitted over the control channels are referred to herein as control signals, and the signals transmitted over the traffic channels are referred to herein as traffic signals. Forward traffic frames are frames transmitted over the forward traffic channel, and reverse traffic frames are frames transmitted over the reverse traffic channel. Each forward and reverse traffic frame includes voice or data and error control information, typically in the form of a cyclical redundancy code (CRC).

Power control varies the power output of base station 10 and mobile terminal 20 to maintain a constant frame error rate at both the base station and the mobile terminal. A frame error occurs when one or more uncorrectable bit errors occur in a frame. The frame error rate is the number of frame errors divided by the total number of frames observed. A desired frame error rate is selected to minimize power and therefore optimize capacity without compromising signal quality. If the frame error rate exceeds the desired frame error rate, the usefulness of the signal is reduced and the power level is increased to decrease the number of frame errors. If the frame error rate is below the desired frame error rate, the power level exceeds the optimum power level, and the power level is reduced.

In CDMA 2000 wireless communications systems, the power control information in updated at an 800 Hz rate on both the forward and reverse links. Each frame includes sixteen 1.25 ms time intervals, referred to herein as power control groups. Power control information, referred to herein as a power-control bit, is sent once every power control group, or every 1.25 ms.

In CDMA 2000 communication systems, power control on the reverse link is implemented using outer loop 50 and inner loop 60. Outer loop 50 adjusts a targeted signal-to-noise ratio for the reverse link, where the targeted signal-to-noise ratio is chosen to produce a desired frame error rate. Inner loop 60 keeps the signal-to-noise ratio on the reverse link as close as possible to the targeted signal-to-noise ratio. Signal-to-noise ratios are often expressed as the ratio $E_b/N_0$, where $E_b$ is the energy per information bit and $N_0$ is the power spectral density of the interference seen by the receiver.

Outer loop 50 of base station 10 determines targeted $E_b/N_0$ 70 using a desired frame error rate, which is typically 1%, but can be increased or decreased depending on the desired system performance. In outer loop 50, base station 10 checks the CRC of each reverse traffic frame to determine whether the reverse traffic frame contains an error. If there is an error in the reverse traffic frame, targeted $E_b/N_0$ 70 is increased by one up step size. If there is no error in the reverse traffic frame, targeted $E_b/N_0$ 70 is decreased by one down step size. The down step size is typically much smaller than the up step size. For example, in a typical system, the down step size is about 0.01 dB, and the up step size is about 1 dB. The ratio of the down step size to the up step size is set equal to the desired frame error rate. For example, 0.01 dB/1 dB=1%, so that in steady state, the targeted $E_b/N_0$ 70 settles at a value close to the $E_b/N_0$ needed to achieve the desired frame error rate.

In inner loop 60, targeted $E_b/N_0$ 70 is compared to the received signal's $E_b/N_0$ 80 at the end of every power control group. The base station measures and averages the energy per information bit for the power control group, and it measures and averages the noise and interference of the signal for the power control group. The ratio of these two averages is power-control-group (pcg) $E_b/N_0$ 80. Although, the pcg $E_b/N_0$ 80 can be measured in any way that obtains an accurate measurement. When pcg $E_b/N_0$ 80 is smaller than targeted $E_b/N_0$ 70, base station 10 sends a power-control bit on forward link 30 indicating that mobile terminal 20 should increase the power of reverse link 40 by a fixed amount. When pcg $E_b/N_0$ 80 is larger than targeted $E_b/N_0$ 70, base station 10 sends the power-control bit on forward link 30 indicating that mobile terminal 20 should decrease the power of reverse link 40 by a fixed amount.

In some conventional CDMA wireless communications systems, the reverse-link power control is identical to the reverse-link power control for CDMA 2000 wireless communications systems described above. In other conventional CDMA systems, the reverse-link power control is slightly different. In the latter systems, instead of measuring the $E_b/N_0$ for every power control group, the base station measures a different energy measurement closely related to the $E_b/N_0$ and uses this energy measurement instead of $E_b/N_0$.

The forward-link power control in some CDMA 2000 systems also works similarly to the reverse-link power control in CDMA 2000 systems described above. In outer loop 110, mobile terminal 20 determines targeted $E_b/N_0$ 120 using a desired frame error rate, which is typically 1%, but can be increased or decreased depending on the desired system performance. In outer loop 110, mobile terminal 10 checks the CRC of each forward traffic frame to determine whether the forward traffic frame contains an error. If there is an error in the forward traffic frame, mobile terminal 20 increases targeted $E_b/N_0$ 120 by one up step size. If there is no error in the forward traffic frame, mobile terminal 20 decreases targeted $E_b/N_0$ 120 by one down step size. In inner loop 140, targeted $E_b/N_0$ 120 is compared to pcg $E_b/N_0$ 150 of the received signal, measured by the mobile terminal 20's receiver. When pcg $E_b/N_0$ 150 is smaller than targeted $E_b/N_0$ 120, mobile terminal 20 sends a power-control bit on reverse link 40 indicating that base station 10 should increase the power of forward link 30. When pcg $E_b/N_0$ 150 is larger than targeted $E_b/N_0$ 120, mobile terminal 20 sends a power-control bit on reverse link 40 indicating that base station 10 should decrease the power of forward link 30.

A problem with this power control system is that power adjustments are not fast enough to compensate for changes in communication channel characteristics produced by fast moving mobile terminals. The above-described system adjusts the targeted $E_b/N_0$ once per frame based on whether the frame is an errored frame. This technique may result in a long delay before the targeted $E_b/N_0$ is adjusted to a value that will produce the desired frame error rate, which is typically 1%. Several frame errors must be observed before the actual frame error rate may be accurately determined. This means that hundreds, or possibly even thousands, of frames are needed before the frame error rate reaches the targeted percentage. However, during these frames, while the power control loop is still adjusting the transmitted power to get to the desired frame error rate, the propagation losses between the mobile terminal and the base station can vary due to movement of the mobile terminal. The change in the propagation losses can cause a change in the $E_b/N_0$ needed to obtain the desired frame error rate. Thus, the required $E_b/N_0$ needed to get the desired frame error rate can change in less time than it takes for the reception of the number of frames needed to adjust the frame error rate to the targeted percentage. This produces one of two problems. In one problem, too much power is transmitted, causing a reduction in capacity of the wireless communication system, which reduces the revenue generated by the system. In the other problem, not enough power is transmitted, causing an increase in the number of errors, which reduces the usefulness of the signal.

SUMMARY OF THE INVENTION

The invention solves the above problems by allowing for quicker adjustments of a targeted signal quality measurement in a wireless communication system through the use of an effective signal quality measurement for each time period. The signal quality measurements of the time period produce a certain quality of service measurement. The quality of service measurement is a measurement of how well the signal is received. For example, the quality of service measurement can be the frame error rate. The effective signal quality measurement is the signal quality measurement that would produce this certain frame error rate in a model channel. The model channel can be any channel where the signal quality measurement varies in a well-defined and known manner over time. For example, the model channel can be an additive white Gaussian noise (AWGN) channel, in which the signal quality measurement remains constant over time. Obtaining an effective signal quality measurement for each time period allows quicker adjustments of the targeted signal quality measurement. This permits the targeted signal quality measurement to be closer to a signal quality measurement that produces a desired frame error rate. This allows the transmitted power to be closer to the power needed to produce the desired frame error rate, permitting an increase in the capacity of the wireless communication system while still maintaining an acceptable number of errors.

The system implements power control by obtaining the effective signal quality measurement for each time period, comparing it to a model targeted signal quality measurement, and adjusting the targeted signal quality measurement based on the comparison. The effective signal quality measurement for the time period is obtained by measuring a signal quality measurement for each interval of a time period to obtain a plurality of signal quality measurements for a time period and mapping these signal quality measurements to obtain the effective signal quality measurement. For example, the effective signal quality measurement for the time period can be obtained by mapping a vector signal quality measurement into a scalar. A signal quality measurement is measured for each interval of a time period. The signal quality measurements for all of the intervals in one time period compose the vector signal quality measurement.

The model targeted signal quality measurement is the signal quality measurement value that produces a desired frame error rate in the model channel. The effective signal quality measurement is then compared to the model targeted signal quality measurement. The targeted signal quality measurement is increased by an up step size when the effective signal quality measurement is smaller than the model targeted signal quality measurement, and decreased by a down step size when the effective signal quality measurement is larger than the model targeted signal quality measurement.

The wireless communication system includes a transmitter to transmit a signal, a receiver to receive the signal, and an outer control loop to control targeted signal quality measurement. The outer control loop controls the targeted signal quality measurement by adjusting it based on a comparison of the effective signal quality measurement of the signal to the model targeted signal quality measurement. In one embodiment, the invention is implemented in software; in another embodiment, the invention is implemented in hardware. In the latter embodiment, the system has a signal quality measurement detector for measuring a signal quality measurement for an interval of a particular time period. The outer control loop has a memory for storing a plurality of signal quality measurements. An output of the memory is coupled to a processor that obtains an effective signal quality measurement. An output of the processor is coupled to a first comparator which compares the effective signal quality measurement to the model targeted signal quality measurement. An output of the first comparator is coupled to a control input of a summer. The summer increases the targeted signal quality measurement by an up step size when the effective signal quality measurement is smaller than the model targeted signal quality measurement; and it decreases the targeted signal quality measurement by a down step size when the effective signal quality measurement is larger than the model targeted signal quality measurement.

DETAILED DESCRIPTION

Figure 2:
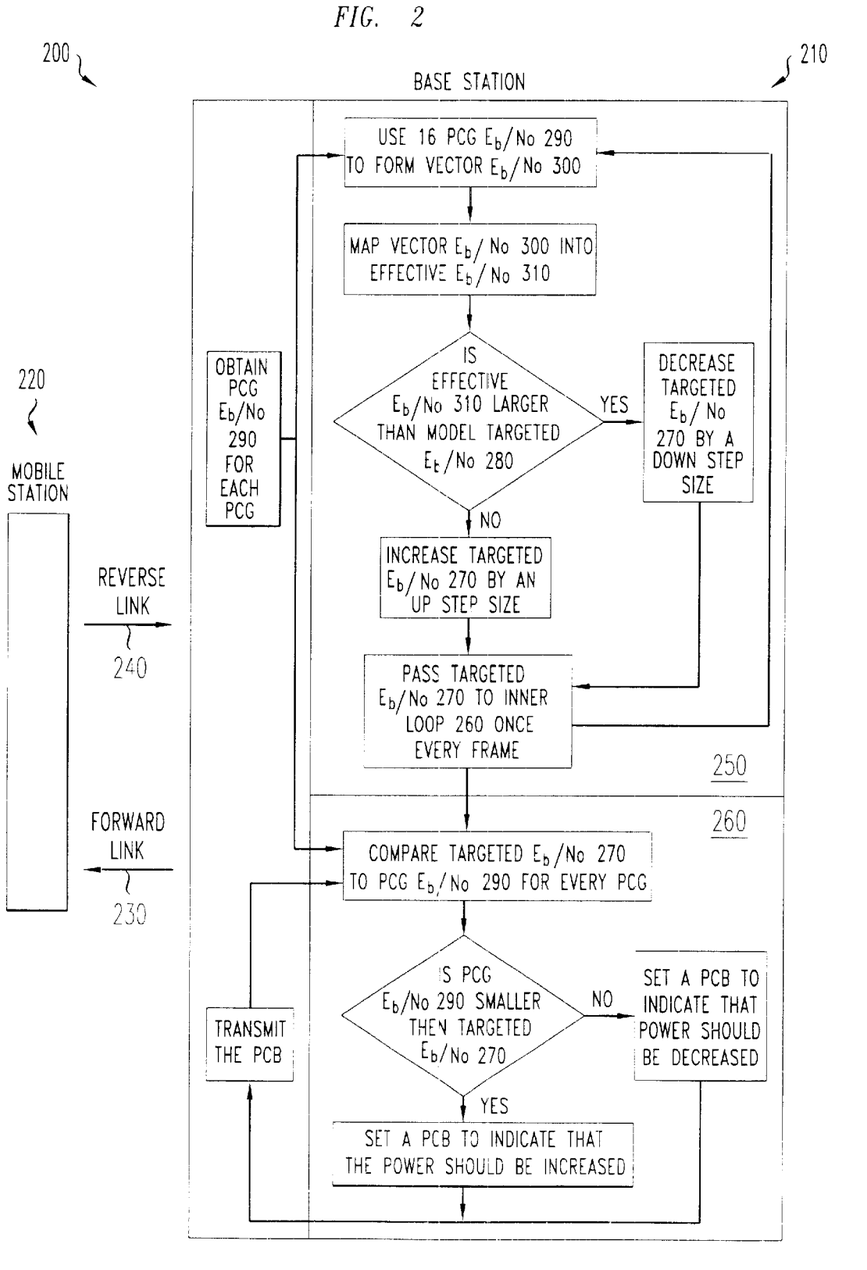
FIG. 2 illustrates power control on the reverse link using effective $E_b/N_0$.

FIG. 2 illustrates a wireless communication system 200 having base station 210 and mobile terminal 220 used in accordance with the present invention. Base station 210 and mobile terminal 220 communicate using forward link 230 and reverse link 240 employing Code Division Multiple Access (CDMA) 2000 techniques. It should be noted that the present invention is applicable to base stations and mobile terminals employing other CDMA techniques and as well as other multiple access techniques.

In CDMA 2000 communication systems, power control on the reverse link is implemented using outer loop 250 and inner loop 260. In outer loop 250, base station 210 adjusts a targeted signal quality measurement for the reverse link, where the targeted signal quality measurement is chosen to produce a desired quality of service measurement. The quality of service measurement is a measurement of how well the signal is received. For example, the quality of service measurement can be the frame error rate, or the bit error rate. The desired frame error rate is typically 1%, but can be increased or decreased depending on the desired system performance. The signal quality measurement can be any measurement that indicates the quality of the signal received from mobile terminal 220 by base station 210. Preferably, the signal quality measurement is a signal-to-noise ratio, such as an $E_b/N_0$, which is often used to express the signal-to-noise ratio. Therefore, in outer loop 250 base station 210 adjusts the targeted $E_b/N_0$ for the reverse link, where the targeted $E_b/N_0$ is chosen to produce a desired frame error rate. Through inner loop 260, base station 210 attempts to keep the $E_b/N_0$ on the reverse link as close to as possible the targeted $E_b/N_0$.

Outer loop 250 is provided with model targeted $E_b/N_0$ 280. Model targeted $E_b/N_0$ 280 is based on the desired frame error rate. Model targeted $E_b/N_0$ 280 can be obtained by simulating or analyzing system performance over a model channel. The system performance is the performance of the transmission and reception scheme. The model channel can be any channel where the $E_b/N_0$ varies in a well-defined and known manner over time, such as an additive white Gaussian noise (AWGN) channel, since the $E_b/N_0$ remains constant over time in an AWGN channel. In the analysis or simulation, a transmitter and receiver pair should be used that is identical to the transmitter and receiver pair in the wireless communication system 200. For a particular transmitter and receiver pair, an AWGN channel can be specified by specifying the $E_b/N_0$ of the channel. An AWGN channel at a particular $E_b/N_0$ produces a particular frame error rate. The analysis or simulation is repeated at different $E_b/N_0$ values to obtain the $E_b/N_0$ value at which the system has the desired frame error rate, typically 1%. The model targeted $E_b/N_0$ is this $E_b/N_0$ value. Because in an AWGN channel the $E_b/N_0$ remains constant over time, the frame error rate of an AWGN channel can be related to an $E_b/N_0$ value. However, in an actual communication channel the $E_b/N_0$ does not change in a well-defined manner. This is due to fading, and it makes it difficult to relate a frame error rate to the $E_b/N_0$ of an actual communication channel.

Outer loop 250 can initially set targeted $E_b/N_0$ 270 to be equal to the model targeted $E_b/N_0$ 280, although targeted $E_b/N_0$ 270 can be initially set in any known manner.

Outer loop 250 also determines the effective $E_b/N_0$ 310 and compares it to the model targeted $E_b/N_0$ 280. The $E_b/N_0$ values of the signal during the frame produce a certain frame error rate. Effective $E_b/N_0$ 310 is the $E_b/N_0$ that would produce this certain frame error rate in an AWGN channel. Therefore, to obtain effective $E_b/N_0$ 310, base station 210 first obtains the $E_b/N_0$ values of the signal during the frame. Base station 210 measures and averages the energy per information bit of the received signal for each interval of a time period, such as a power control group. Base station 210 also measures and averages the noise and interference of the received signal for each power control group. The ratio of these two averages is power-control-group (pcg) $E_b/N_0$ 290. Although, the pcg $E_b/N_0$ 290 can be measured in any way that obtains an accurate measurement. Since there are 16 power control groups in a frame, there are 16 pcg $E_b/N_0$ 290 in a frame. These 16 pcg $E_b/N_0$ 290 compose 16 dimensional vector $E_b/N_0$ 300. Although vector $E_b/N_0$ 300 has been described having 16 dimensions, one skilled in the art will understand that vector $E_b/N_0$ 300 can be K dimensional, where K is an integer value. The K pcg $E_b/N_0$ can be obtained by determining pcg $E_b/N_0$ 290 for a time period other than one frame, or by determining pcg $E_b/N_0$ 290 either more or less frequently than once per power control group, or by both of the foregoing.

Vector 300 is then mapped into a scalar $E_b/N_0$ value, which is the effective $E_b/N_0$ 310. Any method can be used that maps vector $E_b/N_0$ 300 into a scalar $E_b/N_0$ value, provided the method obtains an $E_b/N_0$ value that produces the same frame error rate in an AWGN channel as exists on the reverse link during the frame. One such method of mapping a vector $E_b/N_0$ into a scalar value can be found in Nanda, Sanjiv and Kiran M. Rege "Frame Error Rates for Convolutional Codes on Fading Channels and the Concept of Effective $E_b/N_0$", *IEEE transactions on Vehicular Technology*, Vol. 47. No.4, November 1998, p.1245–50.

In this method, the probability that a minimum weight error event would start at a particular bit is determined for every bit in the frame. The minimum weight error event occurs when the decoded bit sequence at the receiver differs from the transmitted bit sequence by the minimum number of bits by which two valid sequences can differ. The contiguous segment of bits over which the decoded bit sequence differs from the transmitted bit sequence is the minimum weight error event. Within the minimum weight error event, M bits are in error, and N error-free bits are interspersed between the M bits that are in error. M+N=D, where D is the length of the minimum weight error event. For example, in a CDMA 2000 system with a convolutional code or rate R, where R is equal to ⅓, the minimum weight error event has 18 bits that are in error, spread over a contiguous segment of 27 bits, therefore D=27, M=18, and N=9.

After the probability that a minimum weight error event would start at a particular bit is determined for every bit in the frame, the bit that has the highest probability that a minimum weight error event would start at this bit is selected. Starting at this bit, the $E_b/N_0$ values corresponding to the bits M bits that actually differ are averaged. This averaged value is the effective $E_b/N_0$. A more detailed mathematical explanation of the mapping is provided below in the section entitled "Mathematical Explanation of One Method for Mapping Effective $E_b/N_0$ for CDMA 2000."

After effective $E_b/N_0$ 310 is determined, outer control loop 250 compares effective $E_b/N_0$ 310 and model targeted $E_b/N_0$ 280. If effective $E_b/N_0$ 310 is larger than model targeted $E_b/N_0$ 280, targeted $E_b/N_0$ 270 is decreased by one down step size. If effective $E_b/N_0$ 310 is smaller than model targeted $E_b/N_0$ 280, targeted $E_b/N_0$ 270 is increased by one up step size. The down step size and the up step size can be any fixed or variable size. For example, the down step size and up step size can both be equal to any value in the range of 0.1 dB to 1 dB. Alternatively, the value of the step sizes can be a ftnction of the difference between effective $E_b/N_0$ 310 and model targeted $E_b/N_0$ 280. For example, the step sizes can be proportionate to the difference between effective $E_b/N_0$ 310 and model targeted $E_b/N_0$ 280.

Targeted $E_b/N_0$ 270 is then passed to inner loop 260. In inner loop 260, targeted $E_b/N_0$ 270 is compared to the received signal's pcg $E_b/N_0$ 290 every power control group. When pcg $E_b/N_0$ 290 is smaller than targeted $E_b/N_0$ 270, base station 210 sends a power-control bit on forward link 230 indicating that mobile terminal 220 should increase the power of reverse link 240. When pcg $E_b/N_0$ 290 is larger than targeted $E_b/N_0$ 270, base station 210 sends the power-control bit on forward link 230 indicating that mobile terminal 220 should decrease the power of reverse link 240.

Figure 3:
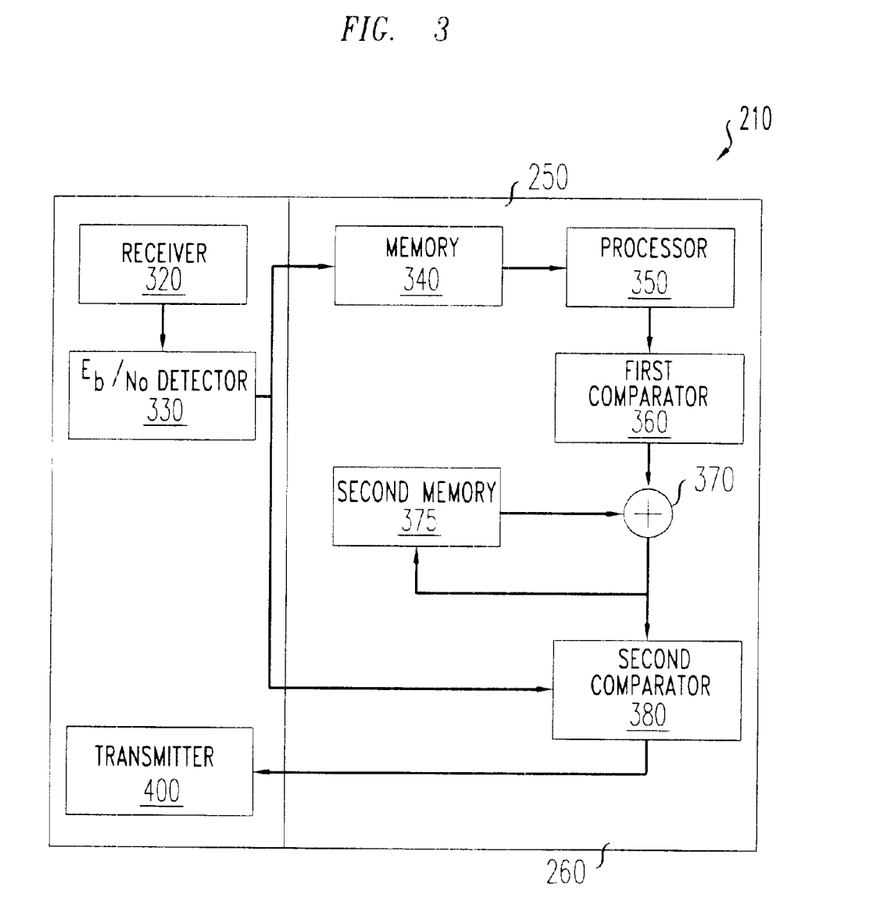
FIG. 3 is a block diagram of a reverse link using effective $E_b/N_0$.

In a preferred embodiment, the present invention is implemented in software. However, as shown in FIG. 3, the invention can also be implemented in hardware. Base station 210 includes receiver 320 that receives the voice and/or data on the reverse link and passes it to $E_b/N_0$ detector 330. $E_b/N_0$ detector 330 measures the $E_b/N_0$ for each power control group, and passes the pcg $E_b/N_0$ 290 to both outer loop 250 and inner loop 260.

In outer control loop 250, the $E_b/N_0$ is passed to an input of memory 340 that can store at least 16 pcg $E_b/N_0$. Memory 340 can be a discrete memory or it can be integrated into processor 350. Memory 340 outputs the 16 pcg $E_b/N_0$ to processor 350. Processor 350 performs the calculations to obtain effective $E_b/N_0$ 310 for each frame using the 16 pcg $E_b/N_0$s measured during the frame. Processor 350 outputs effective $E_b/N_0$ 310 to an input of first comparator 360. First comparator 360 compares effective $E_b/N_0$ 310 and model targeted $E_b/N_0$ 280 and outputs whether effective $E_b/N_0$ 310 is smaller or larger than model targeted $E_b/N_0$ 280 to a control input of summer 370. Summer 370 receives targeted $E_b/N_0$ 270, which is typically stored in a second memory 375, and adjusts targeted $E_b/N_0$ 270 based on information received from comparator 360 on the summer's control input. Summer 370 then outputs the adjusted targeted $E_b/N_0$ 270 to inner loop 260 and to second memory 375. Summer 370 increases targeted $E_b/N_0$ 270 by one up step size when effective $E_b/N_0$ 310 is smaller than model targeted $E_b/N_0$ 280, and decreases targeted $E_b/N_0$ 270 by one down step size when effective $E_b/N_0$ 310 is larger than model targeted $E_b/N_0$ 280.

Targeted $E_b/N_0$ 280 is then passed to a first input of second comparator 380 of inner control loop 260. Targeted $E_b/N_0$ 280 is preferably passed to inner control loop 260 once every frame, since targeted $E_b/N_0$ 280 is calculated for each frame. A second input of second comparator 380 receives pcg $E_b/N_0$ 290 for each power control group. Second comparator 380 compares targeted $E_b/N_0$ 280 and pcg $E_b/N_0$ 290 and outputs a power-control bit. The power-control bit indicates to mobile terminal 220 that an increase in the power of the reverse link is needed when pcg $E_b/N_0$ 290 is smaller than targeted $E_b/N_0$ 280, and that a decrease in the power of the reverse link is needed when pcg $E_b/N_0$ 290 is larger than targeted $E_b/N_0$ 280. Transmitter 400 receives the power-control bit and transmits it on the forward link to mobile terminal 220.

Although the above embodiment of the present invention is described with reference to CDMA 2000, it is equally applicable to conventional CDMA systems complying to the IS-95, ANSI-J-008 standards with two small modifications. The first is that if in the conventional CDMA system the base station measures an energy measurement other than the pcg $E_b/N_0$ 290, the system needs to relate that energy measurement to $E_b/N_0$. The second is a modification in the way that effective $E_b/N_0$ 310 is obtained. In the conventional system, the effective $E_b/N_0$ calculation takes into account the coding schemes used in conventional CDMA systems but not used in CDMA 2000, such as mapping each block of 6 bits into a 64-bit Walsh code. One example of obtaining the effective $E_b/N_0$ 310 in a conventional CDMA system is provided in Nanda, Sanjiv and Kiran M. Rege "Error Performance of Convolutional Codes in Fading Environments: Heuristics for Effective $E_b/N_0$ Computation", *Proceedings of the Conference on Information Sciences and Systems*, Princeton N.J., p. 119–23 (1996), incorporated herein by this reference. A more detailed mathematical explanation of the mapping is provided below in the section entitled "Mathematical Explanation of One Method for Mapping Effective $E_b/N_0$ for a Conventional CDMA System."

Figure 4:
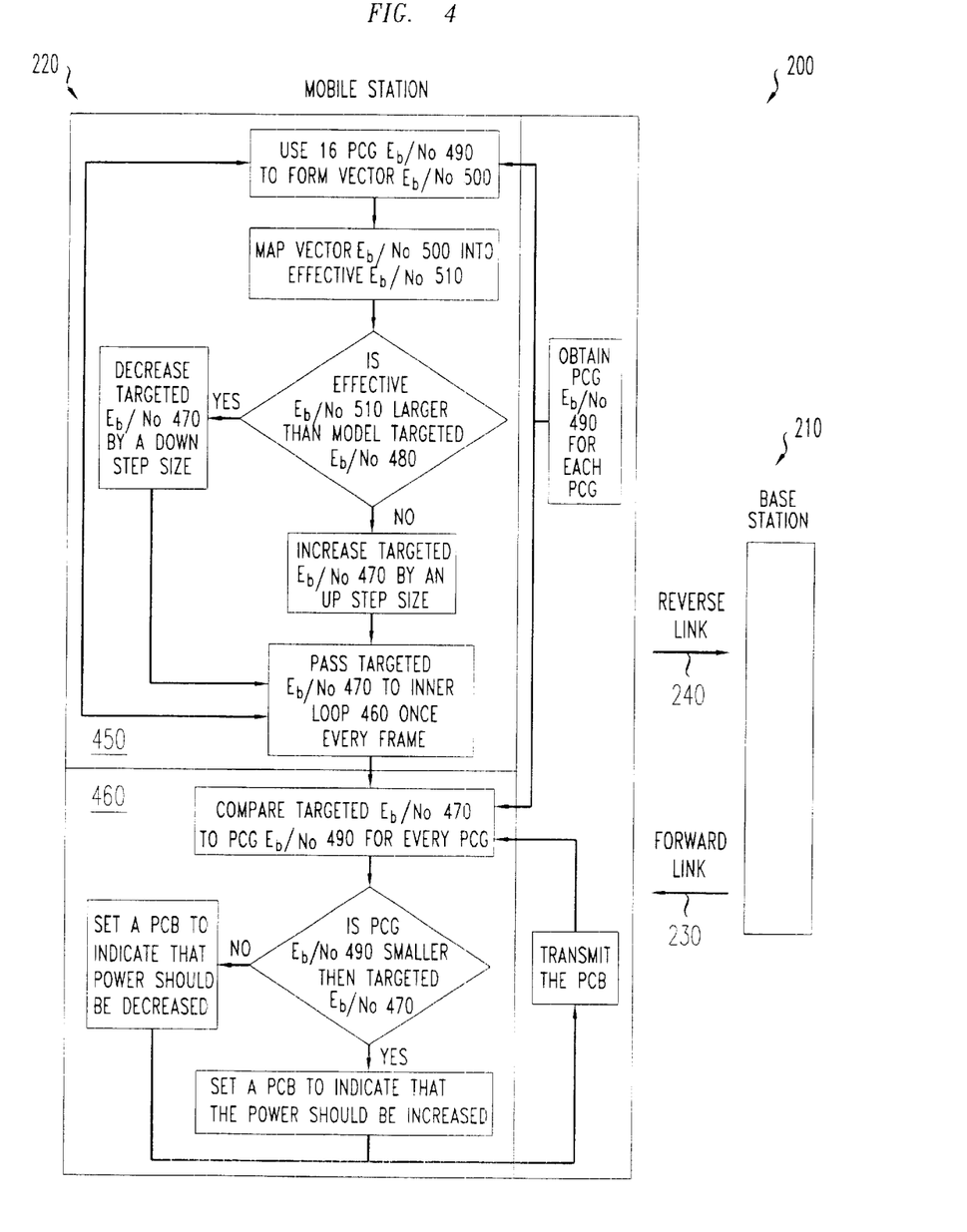
FIG. 4 illustrates power control on the forward link using effective $E_b/N_0$.

The forward-link power control in some CDMA 2000 systems also works similarly to the reverse-link power control in CDMA 2000 systems described above. In this case, mobile terminal 220 would have an outer control loop similar to one described above for base station 210 in a CDMA 2000 system. Referring to FIG. 4, in outer loop 450 mobile terminal 220 determines targeted $E_b/N_0$ 470 using the desired frame error rate. Outer loop 450 determines model targeted $E_b/N_0$ 480, which is the $E_b/N_0$ that produces a frame error rate of 1% in an AWGN channel. Targeted $E_b/N_0$ 470 can initially be set to model targeted $E_b/N_0$ 480, although targeted $E_b/N_0$ 470 can be initially set in any known manner.

Outer loop 450 also determines the effective $E_b/N_0$. Mobile terminal 220 measures the $E_b/N_0$ of the received signal for each power control group, referred to herein as pcg $E_b/N_0$ 490. The peg $E_b/N_0$ 490 corresponding to the 16 power control groups in a frame constitute 16 dimensional vector $E_b/N_0$ 500. (Although vector $E_b/N_0$ 500 has been described as having 16 dimensions, one skilled in the art will understand that vector $E_b/N_0$ 500 can be K dimensional, where K is an integer value.) Vector $E_b/N_0$ 500 is then mapped into a scalar $E_b/N_0$ value, which is the effective $E_b/N_0$ 510. The effective $E_b/N_0$ 510 is the $E_b/N_0$ value that would produce the same frame error rate in an AWGN channel as exists on the forward link during the frame. Similar methods as discussed above with reference to the reverse link of the CDMA 2000 system can be used to perform the mapping of vector $E_b/N_0$ 500 into a scalar $E_b/N_0$ value.

After outer loop 450 determines effective $E_b/N_0$ 510, it compares effective $E_b/N_0$ 510 and model targeted $E_b/N_0$ 480. If effective $E_b/N_0$ 510 is larger than model targeted $E_b/N_0$ 480, targeted $E_b/N_0$ 470 is decreased by one down step size. If effective $E_b/N_0$ 500 is smaller than model targeted $E_b/N_0$ 480, targeted $E_b/N_0$ 470 is increased by one up step size.

Targeted $E_b/N_0$ 470 is then passed to inner loop 460. In inner loop 460, targeted $E_b/N_0$ 470 is compared to pcg $E_b/N_0$ 490 of the received signal, measured for the power control group. When pcg $E_b/N_0$ 490 is smaller than targeted $E_b/N_0$ 470, mobile terminal 220 sends a power-control bit on reverse link 230 indicating that base station 210 should increase the power of forward link 240. When pcg $E_b/N_0$ 490 is larger than targeted $E_b/N_0$ 470, mobile terminal 220 sends the power-control bit on reverse link 230 indicating that base station 210 should decrease the power of forward link 240.

In a CDMA 200 system, the present invention can be implemented in either the reverse or the forward power control loop, or in both the reverse and forward power control loops.

Mathematical Explanation of One Method for Obtaining the Effective $E_b/N_0$ for CDMA 2000

The effective $E_b/N_0$ is the $E_b/N_0$ value that produces the same frame error rate in a model channel, such as an AWGN channel, as exists on the reverse link during the frame. In one method of obtaining effective $E_b/N_0$, the probability $\tilde{P}_e^{(x)}$ that a minimum weight error event would start at a particular bit position x is determined for every bit in the frame. As described above, the minimum weight error event occurs when the decoded bit sequence at the receiver differs from the transmitted bit sequence by the minimum number of bits by which two valid sequences can differ. The contiguous segment of bits over which the decoded bit sequence differs from the transmitted bit sequence is the minimum weight error event. Within the minimum weight error event, M bits are in error, and N error-free bits are interspersed between the M bits that are in error. M+N=D, where D is the length of the minimum weight error event. For example, in a CDMA 2000 system with a convolutional code of rate R, where R is equal to $\frac{1}{3}$ the minimum weight error event has 18 bits that are in error, spread over a contiguous segment of 27 bits, therefore D=27, M=18, and N=9. The positions of the M bits that are in error are determined based on the trellis associated with the convolutional code and the bit position x at which the minimum bit error event starts. The trellis is the state transition diagram associated with the convolutional code. There is a particular pattern of errored bits associated with each bit position beginning at bit position x at which the minimum weight error event starts. Conan, Jean "The Weight Spectra of Some Short Low-Rate Convolutional Codes", *IEEE Transactions on Communications,* Vol.Com.-32 No.9, September 1984, p.1050–53 provides a method of obtaining such patterns.

A bound on the probability $\tilde{P}_e^{(x)}$ that a minimum weight error event starts at a particular bit position x is the Bhattacharyya bound Z. The Bhattacharyya bound is a conservative approximation of the probability that when a first sequence of bits is transmitted, the received signal will be closer to a second sequence of bits than to the first sequence of bits, where both the first and second sequences are valid sequences under the applicable encoding scheme. In this case, the two sequences differ by the minimum weight error event. The Bhattacharyya bound on the probability $\tilde{P}_e^{(x)}$ is the product of the Bhattacharyya bounds on the bit error probabilities associated with bit positions where errors occur in the minimum weight error event that starts at bit position x. The Bhattacharyya bound on the bit error probability is a conservative approximation of the probability that the corresponding bit is incorrectly received, and is a function of the $E_b/N_0$ associated with that bit position. Thus, the probability $\tilde{P}_e^{(x)}$ that the minimum weight error event starts at a particular bit position x is approximated by the product of the Bhattacharyya bounds on bit error probabilities associated with bit positions where bit errors occur in that minimum weight error event.

$$\tilde{P}_e^{(x)} = Z((E_b/N_0)_1^{(x)}) * Z((E_b/N_0)_2^{(x)}) * \ldots * Z((E_b/N_0)_M^{(x)}) \quad (1)$$

where $Z((E_b/N_0)_1^{(x)}), Z((E_b/N_0)_2^{(x)}), \ldots, Z((E_b/N_0)_M^{(x)})$ are the Bhattacharyya bounds on the bit error probabilities associated with the M bit positions where errors occur in the minimum weight error event starting at bit position x.

For the modulation scheme used in CDMA 2000 systems, the Bhattacharyya bounds $Z((E_b/N_0)_k^{(x)})$ on the bit error probabilities associated with the M bit positions where errors occur in the minimum weight error event starting at bit position x are defined in equation 2.

$$Z((E_b/N_0)_k^{(x)}) = e^{-R(E_b/N_0)_k(x)} \quad (2)$$

Where R is the rate of the convolutional code, typically R=$\frac{1}{3}$. Using equation 2 in equation 1:

$$\tilde{P}_e^{(x)} = e^{-R*((E_b/N_0)_1(x) + (E_b/N_0)_2(x) + \ldots + (E_b/N_0)_M(x))} \quad (3)$$

Using equation 3, the probability $\tilde{P}_e^{(x)}$ that a minimum weight error event would start at a particular bit position is determined for every bit position in the frame. The bit position w that has the highest probability that a minimum weight error event would start at this bit position is selected. Starting at this bit position w, the $E_b/N_0$ values corresponding to the M bits within the minimum error event where the bit errors occur are averaged. This averaged value is the effective $E_b/N_0$.

$$E_b/N_0 = \frac{(E_b/N_0)_1^{(w)} + (E_b/N_0)_2^{(w)} + \cdots + (E_b/N_0)_M^{(w)}}{M} \quad (4)$$

Mathematical Explanation of One Method of Obtaining the Effective $E_b/N_0$ for a Conventional CDMA System As described above, the effective $E_b/N_0$ is the $E_b/N_0$ value that produces the same frame error rate in a model channel, such as an AWGN channel, as exists on the reverse link during the frame. The probability $\tilde{P}_e^{(x)}$ that a minimum weight error event would start at a particular bit position x is determined for every bit in the frame. As described above, within the minimum weight error event M bits are in error, and N error-free bits are interspersed between the M bits that are in error. M+N=D, where D is the length of the minimum weight error event. For example, for in a CDMA 2000 system with a convolutional code rate of R, where R is equal to $\frac{1}{3}$, the minimum weight error event has 18 bits that are in error, spread over a contiguous segment of 27 bits, therefore D=27, M=18, and N=9.

A bound on the probability $\tilde{P}_e^{(x)}$ that a minimum weight error event would start at a particular bit position x is the Bhattacharyya bound Z. This probability can be expressed as a product of the Bhattacharyya bounds on bit error probabilities beginning at bit position x and corresponding to bit positions of the M bits within the minimum error event where the bit errors occur.

$$\tilde{P}_e^{(x)} = Z((E_b/N_0)_1^{(x)}) * Z((E_b/N_0)_2^{(x)}) * \ldots * Z((E_b/N_0)_M^{(x)}) \quad (1)$$

Typically, conventional CDMA systems use a soft decision Viterbi decoder to decode the convolutional code. Bhattacharyya bound on the bit error probability in a hard decision Viterbi decoder can be used as an approximation of the bit error probability in an actual system that employs a soft decision Viterbi decoder. Bhattacharyya bound on the bit error probability $Z((E_b/N_0)_k^{(x)})$, in a hard decision Viterbi decoder is $$Z((E_b/N_0)_k^{(x)}) = \sqrt{(P_b)_{k^{(x)}*(1-(P_b)_{k^{(x)}})}} \quad (5)$$

Where $(P_b)_k^{(x)}$ is the probability of a bit error at the $k^{th}$ position at which a bit error occurs in the minimum weight error event in a hard decision Viterbi decoder.

$$(P_b)_k^{(x)} = 0.5 f(2(E_b/N_0)_k^{(x)}) \quad (6)$$

IS-95 based CDMA systems employ Walsh modulation, in which each six-bit block is coded into a 64-bit Walsh sequence prior to transmission. $f(2(E_b/N_0)_k^{(x)})$ is the probability that in the decoding process an incorrect Walsh sequence is detected. This probability is a function of the ratio of the signal energy per Walsh sequence $E_W$ and of the noise spectral density. For the ⅓ rate convolutional code $E_W = 2 E_b$. The probability of detection of an incorrect Walsh sequence is a function of $E_W/N_0$, $f((E_W/N_0)_k^{(x)})$, which is equal to $f(2(E_b/N_0)_k^{(x)})$. $f(2(E_b/N_0)_k^{(x)})$ can be determined as follows. The Walsh demodulator consists of a bank of 64 correlators, one for each Walsh sequence. Assuming that the noise variance in all correlators is normalized to unity, the amplitude of the output of the Walsh correlator corresponding to the correct Walsh sequence has a Rician probability distribution function $f_C(\ )$. Rician distribution arises when there is a dominant signal arriving with many weaker multipath signals. Rician distribution is often described in terms of a Rice parameter, K, which is defined as the ratio between the deterministic signal power and the variance of the random component. In our case $K = ((E_W/N_0)_k^{(x)})$. The outputs of the remaining 63 Walsh correlators have amplitudes that are independent and identically distributed with Rayleigh probability distribution function $f_1(\ )$ and average energy $E[I^2] = 1$. Thus, the probability of incorrect detection of the Walsh sequence is the probability that the largest of these 63 independent and identically distributed random variables with probability distribution function $f_1(\ )$ exceeds the random variable with probability distribution function $f_C(\ )$. This probability can be evaluated numerically as a function of $K = 2(E_b/N_0)_k^{(x)}$, and is denoted $f(2(E_b/N_0)_k^{(x)})$. Since all incorrect Walsh sequences are equally probable and mapped into all three combinations of six coded symbols, the probability of a coded symbol being in error, given incorrect detection, is approximately half. Therefore, the probability of bit error, $(P_b)_k^{(x)}$, is equal to $0.5 f(2(E_b/N_0)_k^{(x)})$.

Using equation 5 and 6 in equation 1:

$$\tilde{P}_e^{(x)} \cong \sqrt{0.5 f(2(E_b/N_0)_1^{(x)}) * (1 - 0.5 f(2(E_b/N_0)_1^{(x)}))} * \\ \sqrt{0.5 f(2(E_b/N_0)_2^{(x)}) * (1 - 0.5 f(2(E_b/N_0)_2^{(x)}))} * \\ \cdots * \sqrt{0.5 f(2(E_b/N_0)_M^{(x)}) * (1 - 0.5 f(2(E_b/N_0)_M^{(x)}))} \quad (7)$$

Using equation 7, the probability $\tilde{P}_e^{(x)}$ that a minimum weight error event would start at a particular bit is determined for every bit position in the frame. The bit position w that has the highest probability that a minimum weight error event would start at this bit position is selected. Starting at this bit position w, the $E_b/N_0$ values corresponding to the M bits of the minimum weight error event where the bit errors occur are computed to evaluate $\tilde{P}_e^{(W)}$. $\tilde{P}_e^{(W)}$ can then be used to determine effective $E_b/N_0$ using equation 8.

$$E_b/N_o = \frac{1}{2} f^{-1} \left( 1 - \sqrt{1 - 4(\tilde{P}_e^{(W)})^{2/M}} \right) \quad (8)$$

where $f^{-1}(\ )$ is the inverse function associated with $f(\ )$. For the case where a single multipath is being decoded, $$f(E_b/N_0) = \exp(-0.275 * \exp(0.3223(E_b/N_0))) \quad (9)$$

is a good approximation for the relationship between $E_b/N_0$ and the corresponding Walsh error probability. The corresponding inverse function is given by $f^{-1}(y) = \ln(-\ln(y)/0.275)/0.3223$.

The foregoing is merely illustrative. Thus, for example although in the illustrative embodiment the time period is one frame, any time period can be used. For example, the time period can be several frames, or one or several power control groups.

Additionally, although in the illustrative embodiment the interval is one power control group, any interval of a time period during which a power level measurement can be taken can be used. For example, the interval can be several power control groups, or one or several frames.

While the invention has been described with reference to a preferred embodiment, it will be understood by those skilled in the art having reference to the specification and drawings that various modifications and alternatives are possible therein without departing from the spirit and scope of the invention.

We claim:

1. A method for controlling the power of a signal in a wireless communication system, the method comprising the steps of:

obtaining an effective signal quality measurement for a time period;

comparing a model targeted signal quality measurement with the effective signal quality measurement;

adjusting a targeted signal quality measurement responsive to the effective signal quality measurement being different than the model targeted signal quality measurement;

wherein the effective signal quality measurement is a signal quality measurement value that would produce a quality of service measurement in a model channel substantially equal to the quality of service measurement of the signal during the time period; and wherein the model channel is a channel whose signal quality measurement varies in a well-defined and known manner over time.

2. The method of claim 1, wherein the quality of service measurement comprises frame error rate.

3. The method of claim 1, wherein the model channel comprises an additive white Gaussian noise channel.

4. The method of claim 1, wherein the obtaining step comprises the steps of:

obtaining a signal quality measurement for each of a plurality of intervals of the time period to obtain a plurality of signal quality measurements; and mapping the plurality of signal quality measurement into the effective signal quality measurement for the time period.

5. The method of claim 4, wherein the interval is a power control group.

6. The method of claim 1, wherein the obtaining step comprises the steps of:

obtaining a signal quality measurement for each of a plurality of intervals of the time period to obtain a plurality of signal quality measurements;

obtaining a vector signal quality measurement from the signal quality measurements;

mapping the vector signal quality measurement into a scalar value to obtain an effective signal quality measurement for the time period.

7. The method of claim 1, wherein the model targeted signal quality measurement is that signal quality measurement that produces a desired quality of service measurement in a model channel.

8. The method of claim 7, wherein the model channel comprises an additive white Gaussian noise channel.

9. The method of claim 1, wherein the adjusting step comprises the steps of:

increasing the targeted signal quality measurement by an up step size responsive to the effective signal quality measurement being smaller than the model targeted signal quality measurement; and decreasing the targeted signal quality measurement by a down step size responsive to the effective signal quality measurement being larger than the model targeted signal quality measurement.

10. The method of claim 9, wherein the up step size is about equal to the down step size.

11. The method of claim 9, wherein the up step size and the down step size are a function of the difference between the effective signal quality measurement and the model targeted signal quality measurement.

12. The method of claim 1, wherein the effective signal quality measurement is a signal-to-noise ratio.

13. The method of claim 1, wherein the effective signal quality measurement is an $E_b/N_0$.

14. The method of claim 1, further comprising the steps of:

obtaining the signal quality measurement of the received signal for an interval of a time period;

comparing the obtained signal quality measurement of the received signal to the targeted signal quality measurement;

requesting an increase in power of the received signal responsive to the signal quality measurement of the received signal being smaller than the targeted signal quality measurement; and requesting a decrease in power of the received signal responsive to the signal quality measurement of the received signal being larger than the targeted signal quality measurement.

15. The method of claim 1, wherein the time period is a frame.

16. The method of claim 1, wherein the signal is a reverse link signal.

17. The method of claim 1, wherein the signal is a forward link signal.

18. A wireless communication system comprising:

a transmitter to transmit a signal;

a receiver to receive the signal;

an outer control loop to determine a targeted signal quality measurement based on an effective signal quality measurement of the signal and a model targeted signal quality measurement;

wherein the effective signal quality measurement is a signal quality measurement value that would produce a quality of service measurement in a model channel substantially equal to the quality of service measurement of the signal during a time period; and wherein the model channel is a channel whose signal quality measurement varies in a well-defined and known manner over time.

19. The wireless communication system of claim 18, wherein:

the wireless communication system further includes a signal quality measurement detector for measuring a signal quality measurement for an interval of a time period;

and the outer control loop includes:

a processor having an input coupled to an output of the signal quality measurement detector, the processor for obtaining the effective signal quality measurement;

a first comparator having a first input coupled to the processor for receiving the effective signal quality measurement, a second input for receiving a model targeted signal quality measurement, and an output; and a summer having a control input coupled to the output of the first comparator, the summer for adjusting the targeted signal quality measurement up by an up step size responsive to the effective signal quality measurement being smaller than the model targeted signal quality measurement and down by a down step size responsive to the effective signal quality measurement being larger than the model targeted signal quality measurement.

20. The wireless communication system of claim 19, further comprising an inner control loop to set a power-control bit based on the obtained signal quality measurement and the targeted signal quality measurement, the inner control loop includes:

a second comparator having a first input for receiving the targeted signal quality measurement and a second input coupled to the output of the signal quality measurement detector for receiving a signal quality measurement for the interval.

21. The wireless communication system of claim 19, wherein the up step size is about equal to the down step size.

22. The wireless communication system of claim 19, wherein the up step size and the down step size are a function of the difference between the effective signal quality measurement and the model targeted signal quality measurement.

23. The wireless communication system of claim 19, wherein the signal quality measurement is a signal-to-noise ratio.

24. The wireless communication system of claim 19, wherein the signal quality measurement is an $E_b/N_0$.

25. The wireless communication system of claim 19, wherein the time period is one frame.

26. The wireless communication system of claim 19, wherein the interval is one power control group.

27. The wireless communication system of claim 18, wherein the model targeted signal quality measurement is that signal quality measurement that produces a desired quality of service measurement in a model channel.

28. The method of claim 27, wherein the model channel comprises an additive white Gaussian noise channel.

29. The method of claim 18, wherein the quality of service measurement comprises frame error rate.

30. The method of claim 18, wherein the model channel comprises an additive white Gaussian noise channel.

* * * * *